(12) United States Patent
Hartzler

(10) Patent No.: US 11,927,255 B1
(45) Date of Patent: Mar. 12, 2024

(54) TORQUE CONVERTER BLADE ASSEMBLY

(71) Applicant: Schaeffler Technologies AG & Co. KG, Herzogenaurach (DE)

(72) Inventor: Baylor Hartzler, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/110,491

(22) Filed: Feb. 16, 2023

(51) Int. Cl.
*F16H 41/26* (2006.01)
*F16H 41/24* (2006.01)
*F16H 41/28* (2006.01)

(52) U.S. Cl.
CPC ............. *F16H 41/26* (2013.01); *F16H 41/24* (2013.01); *F16H 41/28* (2013.01)

(58) Field of Classification Search
None
See application file for complete search history.

(56) References Cited

U.S. PATENT DOCUMENTS

| | | | | |
|---|---|---|---|---|
| 5,005,356 A * | 4/1991 | Saunders | ................. | F16H 41/26 60/330 |
| 5,334,112 A * | 8/1994 | Nogle | ..................... | F16H 45/02 475/59 |
| 6,226,985 B1 * | 5/2001 | Sasse | ....................... | F16H 41/26 60/365 |
| 2004/0109770 A1 * | 6/2004 | Schleicher | .............. | F16H 41/28 417/405 |
| 2008/0185257 A1 * | 8/2008 | Ochi | ....................... | F16H 41/24 184/11.2 |
| 2009/0071138 A1 * | 3/2009 | Buedenbender | ........ | F16H 41/26 60/330 |
| 2011/0123349 A1 * | 5/2011 | Olsen | ...................... | F16H 41/28 416/241 R |

FOREIGN PATENT DOCUMENTS

WO 2011063066 A2 5/2011

* cited by examiner

*Primary Examiner* — Courtney D Heinle
*Assistant Examiner* — Michael K. Reitz

(57) ABSTRACT

A blade assembly for a torque converter includes a shell defining an inner surface and a plurality of blades arranged around the inner surface of the shell. The plurality of blades each include a curved portion contacting the inner surface. The plurality of blades each further include a curved region axially spaced from the respective curved portion. The plurality of blades each further include an end extending from the respective curved portion to the respective curved region. Each end includes a notch arranged radially closer to the respective curved region than to the respective curved portion.

19 Claims, 3 Drawing Sheets

TORQUE CONVERTER BLADE ASSEMBLY

TECHNICAL FIELD

The present disclosure relates generally to a blade assembly, and more specifically to torque converter including blade assembly.

BACKGROUND

Torque converters include blade assemblies including a shell, a core ring, and blades to direct fluid flow. The blades are arranged around a circumference of the shell and the core ring and are typically attached to the shell by brazing. Directing the fluid flow creates stress on the blades, which can adversely impact the durability and service life of the blades. It is desirable to have alternative designs and configurations to reduce stress on the blades caused by directing fluid flow in the torque converter.

SUMMARY

Embodiments of this disclosure provide a blade assembly for a torque converter including a shell defining an inner surface and a plurality of blades arranged around the inner surface of the shell. The plurality of blades each including a curved portion contacting the inner surface. Each blade further including a curved region axially spaced from the curved portion. Each blade further including an end extending from the respective curved portion to the respective curved region. Each end including a notch arranged radially closer to the respective curved region than to the respective curved portion.

In embodiments, the blade assembly may further include a core ring connected to the curved region. Each end may include a lip disposed radially between the respective notch and the core ring. Each lip may contact the core ring. Each curved region may include an axially extending tab, and the core ring may include slots each configured to receive one respective axially extending tab.

In embodiments, the end may be arranged radially inside of the curved region. In embodiments, each end may include a lip disposed between the respective curved region and the respective notch. Each lip may extend from the respective end axially away from the shell. Each lip may extend from the respective curved region to the respective notch.

In embodiments, each notch may have a radius between 2 mm and 5 mm, inclusive. In embodiments, a distance determined along the end from the respective curved portion to the respective notch may be eighty percent of a distance determined along the end from the respective curved portion to the respective curved region. In embodiments, each notch may have a depth determined perpendicular to the respective end. Each depth may be 2.5 millimeters (mm). In embodiments, each notch may extend into the respective end axially towards the shell.

Embodiments of this disclosure further provide a blade for a torque converter including a curved portion, a curved region, and an end. The curved portion is configured to contact an inner surface of a shell. The curved region is axially spaced from the curved portion. The end extends extending from the curved portion to the curved region. The end includes a notch arranged radially closer to the curved region than to the curved portion In embodiments, the curved region may include an axially extending tab configured to connect to a core ring. In embodiments, the end may be arranged radially inside of the curved region. In embodiments, the notch may extend into the end axially towards the shell.

In embodiments, the end may include a lip extending from the curved region to the notch. The lip may extend from the end axially away from the shell. The lip may be configured to contact a core ring.

In embodiments, the notch may have a radius between 2 mm and 5 mm, inclusive. In embodiments, a distance determined along the end from the curved portion to the notch may be eighty percent of a distance determined along the end from the curved portion to the curved region. In embodiments, the notch may have a depth determined perpendicular to the end, the depth being 2.5 mm.

Embodiments disclosed herein provide the advantageous benefit of providing a notch in each respective blade that is arranged closer to the core ring than to the shell of the blade assembly, which reduces stress on the blades caused by directing fluid flow in the torque converter. Thus, the durability and service life of blades are increased, contributing to an increase in the durability and service life of blade assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
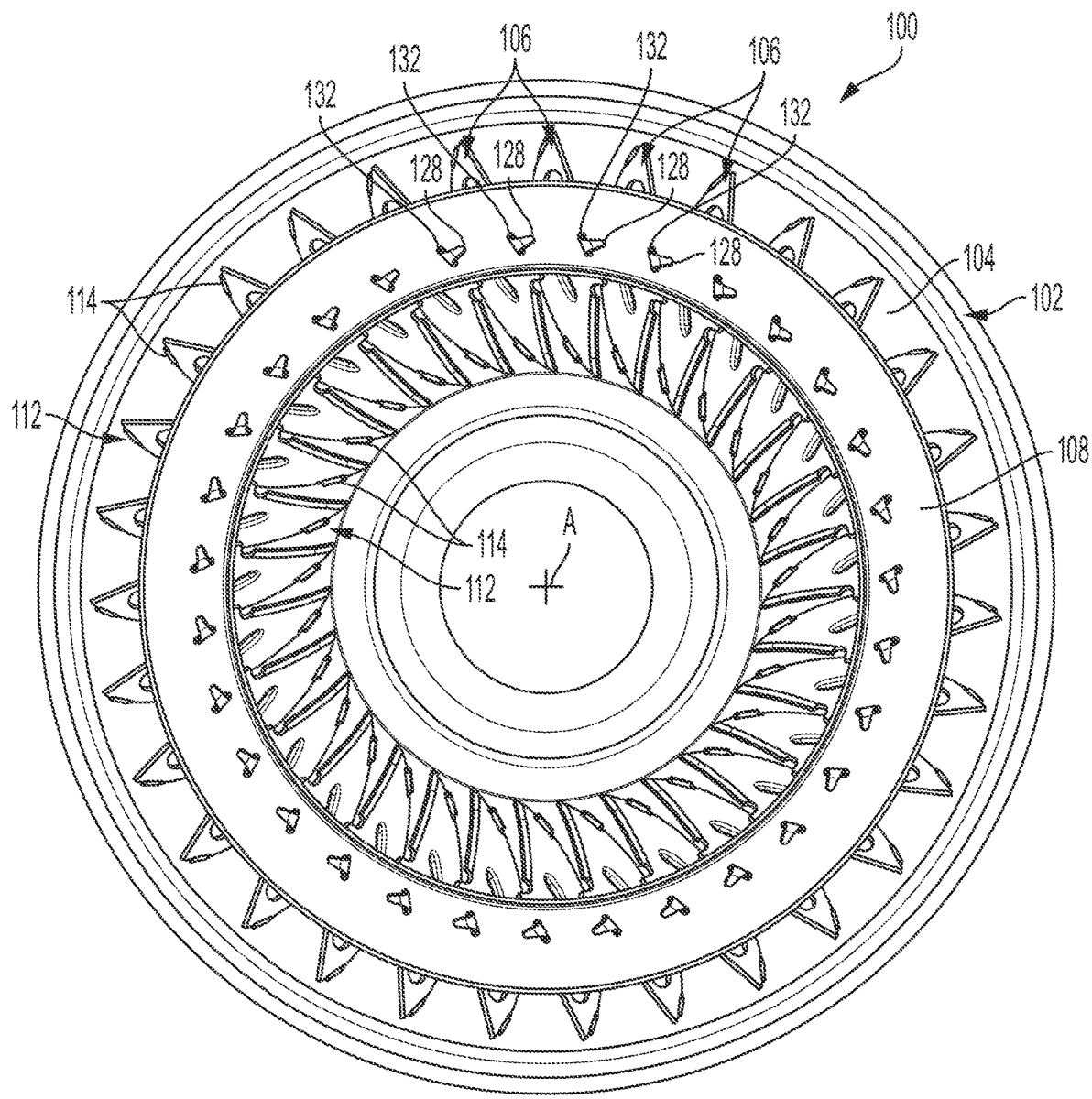
FIG. 1 illustrates a top view of a blade assembly according to an exemplary embodiment of the present disclosure.
Figure 2:
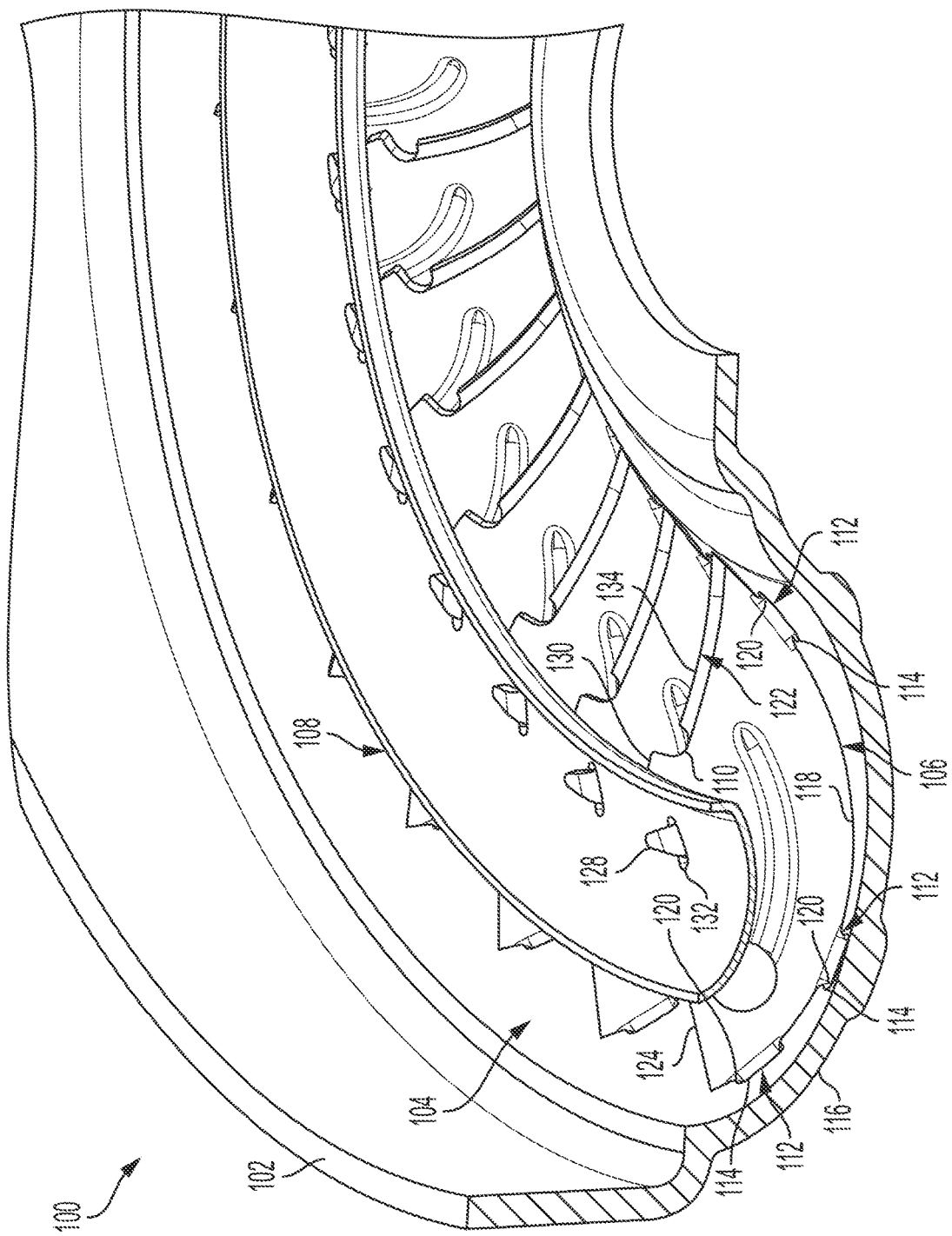
FIG. 2 illustrates a perspective view of a cross-section of the blade assembly of FIG. 1.
Figure 3:
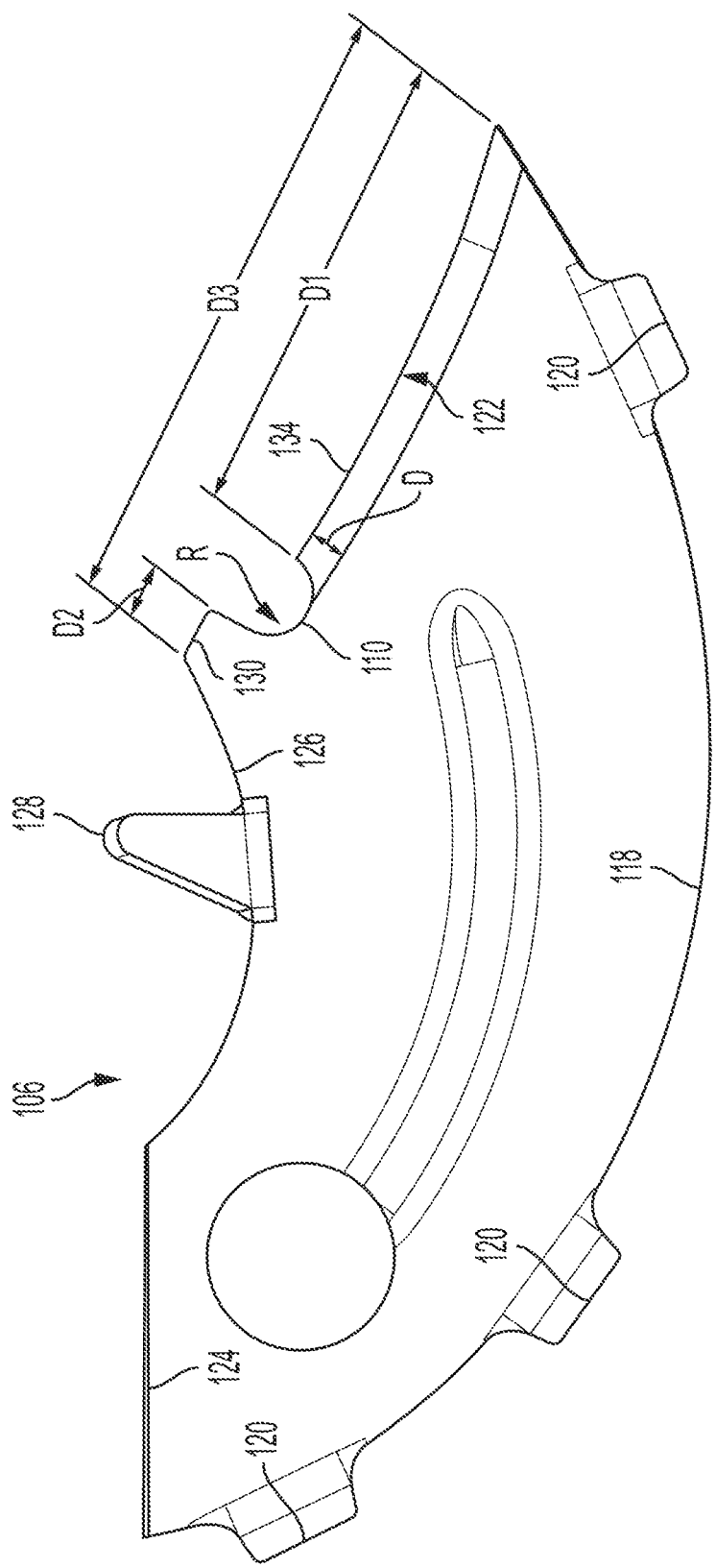
FIG. 3 illustrates a perspective view of a single blade from the blade assembly of FIGS. 1 and 2.

Referring to FIGS. 1-3, a blade assembly for a torque converter is illustrated according to one embodiment of the present disclosure. Words such as "axial," "radial," "circumferential," "outward," etc. as used herein are intended to be with respect to a central axis A shown in FIG. 1.

The blade assembly 100 includes a shell 102 extending annularly about the central axis A and defining an inner surface 104, a plurality of blades 106 arranged around the inner surface 104, and a core ring 108 extending annularly about the central axis A and connected to each of the plurality of blades 106. The blade assembly 100 may be, for example, referred to as an "impeller assembly." In such an example, the shell 102 may be non-rotatably connected to a front cover of the torque converter. The front cover is arranged to receive torque. Alternatively, the blade assembly 100 may be referred to as a "turbine assembly." In such an example, the shell 102 may be disposed axially between the front cover and an impeller assembly. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter may include one or more blade assemblies 100. For example, the torque converter may include one blade assembly 100, e.g., an impeller assembly or a turbine assembly. In this example, the blades 106 of one of the impeller assembly or the turbine assembly include a notch 110 (as discussed further below), and the blades 106 of the other of the impeller assembly or the turbine assembly lack the notch 110. As another example, the torque converter may include two blade assemblies 100, e.g., an impeller assembly and a turbine assembly. In this example, the blades 106 of each of the impeller assembly and the turbine assembly include the notch 110.

The shell 102 includes a row 112 of grooves 114 arranged on the inner surface 104. The grooves 114 may be spaced from each other circumferentially about the central axis A. Each groove 114 is arranged to engage one respective blade 106. That is, the blade assembly 100 includes a same number of grooves 114 as blades 106. The grooves 114 may, for example, extend partially through the shell 102, i.e., are spaced from an exterior surface 116 of the shell 102. As another example, the grooves 114 may extend entirely through the shell 102, i.e., through the exterior surface 116. The shell 102 may include one or more rows 112 of grooves 114. In an example in which the shell 102 includes a plurality of rows 112 of grooves 114, the rows 112 may be radially spaced from each other.

The blades 106 are arranged circumferentially around the inner surface 104 of the shell 102. Each blade 106 includes a curved portion 118 that is configured to abut the inner surface 104 of the shell 102. Each blade 106 includes a tab 120 extending outwardly from the curved portion 118. The blades 106 includes a same number of tabs 120 as each other. Each blade 106 may include one or more tabs 120. Each blade 106 includes a same number of tabs 120 as a number of rows 112 of grooves 114. Each tab 120 is arranged to be received in one respective groove 114 in one corresponding row 112.

Each blade 106 includes a curved region 126 axially spaced from the curved portion 118. The curved region 126 includes an axially extending tab 128. The axially extending tab 128 is engaged with the core ring 108. The core ring 108 includes a plurality of slots 132 circumferentially spaced from each other about the central axis A. Each slot 132 is arranged to receive one respective axially extending tab 128. An interface between the slots 132 and the axially extending tabs 128 connects the blades 106 to the core ring 108.

Each blade 106 further includes a first end 122 and a second end 124 radially spaced from the first end 122. The curved portion 118 extends from the first end 122 to the second end 124. The first end 122 extends from the curved portion 118 to the curved region 126. The second end 124 extends from the curved portion 118 to the curved region 126. The first end 122 is arranged radially inside of the second end 124.

One of the ends 122, 124 includes a leg 134, the notch 110, and a lip 130. In an example in which the blade assembly 100 is an impeller assembly, the first end 122 includes the notch 110. That is, the notch 110 is arranged radially inside of the core ring 108. In an example in which the blade assembly 100 is a turbine assembly, the second end 124 includes the notch 110. That is, the notch 110 is arranged radially outside of the core ring 108.

The lip 130 is disposed radially between the notch 110 and the core ring 108. The lip 130 extends radially from the curved region 126 to the notch 110. The lip 130 may contact the core ring 108. The lip 130 is axially offset relative to the leg 134. That is, the leg 134 is arranged axially between the lip 130 and the shell 102.

The notch 110 extends from the lip 130 to the leg 134. The notch 110 is arranged radially closer to the curved region 126 than to the curved portion 118. That is, a distance D1 determined along the leg 134, i.e., from the curved portion 118 to the notch 110 is greater than a distance D2 determined along the lip 130, i.e., from the curved region 126 to the notch 110. For example, the notch 110 may be arranged such that the distance D1 is eighty percent (80%) of a distance D3 determined along the one end 122, 124, i.e., from the curved portion 118 to the curved region 126.

The notch 110 may, for example, have a semi-circular shape. As another example, the notch 110 may be slot shaped. The notch 110 extends axially into the one end 122, 124, i.e., towards the shell 102. The notch 110 may have a depth determined perpendicular to the leg 134. The depth D may, for example, be 2.5 millimeters (mm). A radius R of the notch 110 may be, e.g., between 2 mm and 5 mm, inclusive.

Embodiments according to the present disclosure provide various advantages including improving the durability and service life of a blade assembly by providing a blade having a notch disposed closer to a core ring than a shell of the blade assembly, which reduces stress on the blade caused by directing fluid flow in the torque converter.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 blade assembly
102 shell
104 inner surface
106 blade
108 core ring
110 notch
112 row
114 groove
116 exterior surface
118 curved portion
120 tab
122 end
124 end
126 curved region
128 axially extending tab
130 lip
132 slot
134 leg
D depth
R radius
D1 distance
D2 distance
D3 distance
A central axis

What is claimed is:

1. A blade assembly for a torque converter, comprising:
a shell defining an inner surface;
a plurality of blades arranged around the inner surface of the shell, the plurality of blades each including:
a curved portion contacting the inner surface;
a curved region axially spaced from the curved portion; and
an end extending from the curved portion to the curved region, the end including a notch arranged radially closer to the curved region than to the curved portion;
wherein a distance determined along the end from the curved portion to the notch is eighty percent of a distance determined along the end from the curved portion to the curved region.

2. The blade assembly of claim 1, further comprising a core ring connected to the curved region.

3. The blade assembly of claim 2, wherein the end includes a lip disposed radially between the notch and the core ring, the lip contacting the core ring.

4. The blade assembly of claim 2, wherein the curved region includes an axially extending tab, and the core ring includes a slot configured to receive the axially extending tab.

5. The blade assembly of claim 1, wherein the end is arranged radially inside of the curved region.

6. The blade assembly of claim 1, wherein the end includes a lip disposed between the curved region and the notch, the lip extending from the end axially away from the shell.

7. The blade assembly of claim 6, wherein the lip extends from the curved region to the notch.

8. The blade assembly of claim 1, wherein the notch has a radius between 2 mm and 5 mm, inclusive.

9. The blade assembly of claim 1, wherein the notch has a depth determined perpendicular to the end, the depth being 2.5 mm.

10. The blade assembly of claim 1, wherein the notch extends into the end axially towards the shell.

11. A blade for a torque converter, comprising:
a curved portion configured to contact an inner surface of a shell;
a curved region axially spaced from the curved portion; and
an end extending from the curved portion to the curved region, the end including a notch arranged radially closer to the curved region than to the curved portion;
wherein the notch has a radius between 2 mm and 5 mm, inclusive.

12. The blade of claim 11, wherein the curved region includes an axially extending tab configured to connect to a core ring.

13. The blade of claim 11, wherein the end is arranged radially inside of the curved region.

14. The blade of claim 11, wherein the end includes a lip extending from the curved region to the notch, the lip extending from the end axially away from the shell.

15. The blade of claim 14, wherein the lip is configured to contact a core ring.

16. The blade of claim 11, wherein a distance determined along the end from the curved portion to the notch is eighty percent of a distance determined along the end from the curved portion to the curved region.

17. The blade of claim 11, wherein the notch has a depth determined perpendicular to the end, the depth being 2.5 mm.

18. The blade of claim 11, wherein the notch extends into the end axially towards the shell.

19. A blade for a torque converter, comprising:
a curved portion configured to contact an inner surface of a shell;
a curved region axially spaced from the curved portion; and
an end extending from the curved portion to the curved region, the end including a notch arranged radially closer to the curved region than to the curved portion;
wherein the notch has a depth determined perpendicular to the end, the depth being 2.5 mm.

* * * * *